United States Patent
Riccabona

[11] Patent Number: 5,848,701
[45] Date of Patent: Dec. 15, 1998

[54] TOOL BUCKET WITH ELECTRICAL CORD STORAGE

[76] Inventor: Michael A. Riccabona, 107 Samuel Ct., Clayton, Calif. 94527

[21] Appl. No.: 889,456

[22] Filed: Jul. 8, 1997

[51] Int. Cl.⁶ .................................................. B65D 85/00
[52] U.S. Cl. ............................ 206/702; 206/373; 439/501
[58] Field of Search ..................................... 206/372, 373, 206/388, 408, 702; 439/501; 242/580, 586, 595

[56] References Cited

U.S. PATENT DOCUMENTS

| | | | |
|---|---|---|---|
| 2,763,707 | 9/1956 | Soderberg . | |
| 3,733,478 | 5/1973 | Barker ...................................... | 242/580 |
| 4,875,878 | 10/1989 | Meyer ...................................... | 439/501 |
| 4,984,685 | 1/1991 | Douglas . | |
| 5,103,977 | 4/1992 | Douglas . | |
| 5,339,956 | 8/1994 | Thomason ................................ | 206/372 |
| 5,344,339 | 9/1994 | Cheslock .................................. | 439/501 |
| 5,421,457 | 6/1995 | Listenberger . | |
| 5,449,067 | 9/1995 | Cannon . | |
| 5,503,571 | 4/1996 | Cheslock .................................. | 439/501 |
| 5,586,655 | 12/1996 | McBride .................................. | 206/388 |
| 5,587,862 | 12/1996 | Frank, Sr. ................................. | 361/42 |
| 5,593,316 | 1/1997 | Lyons ...................................... | 439/501 |
| 5,701,981 | 12/1997 | Marshall et al. ........................ | 439/501 |

*Primary Examiner*—David T. Fidel
*Attorney, Agent, or Firm*—Thomas R. Lampe

[57] ABSTRACT

Apparatus for holding tools and for providing a connection to a source of electrical energy includes a bucket divided into separate interior portions by a divider. A top portion of the bucket interior is employed to carry tools and equipment. A lower interior portion accommodates electrical cords. A cord retraction mechanism is employed to retract one of the cords into the lower interior portion of the bucket.

5 Claims, 3 Drawing Sheets

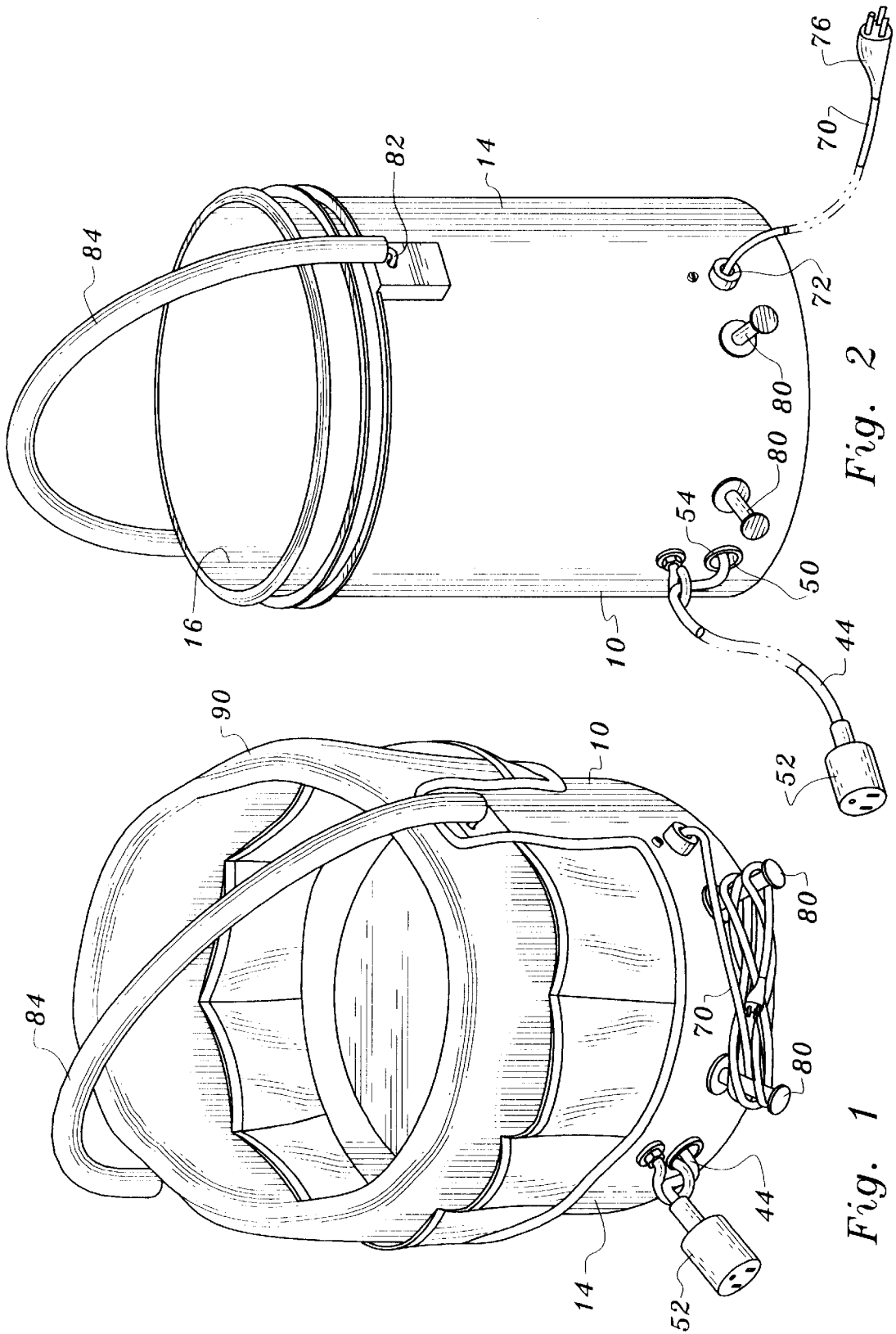

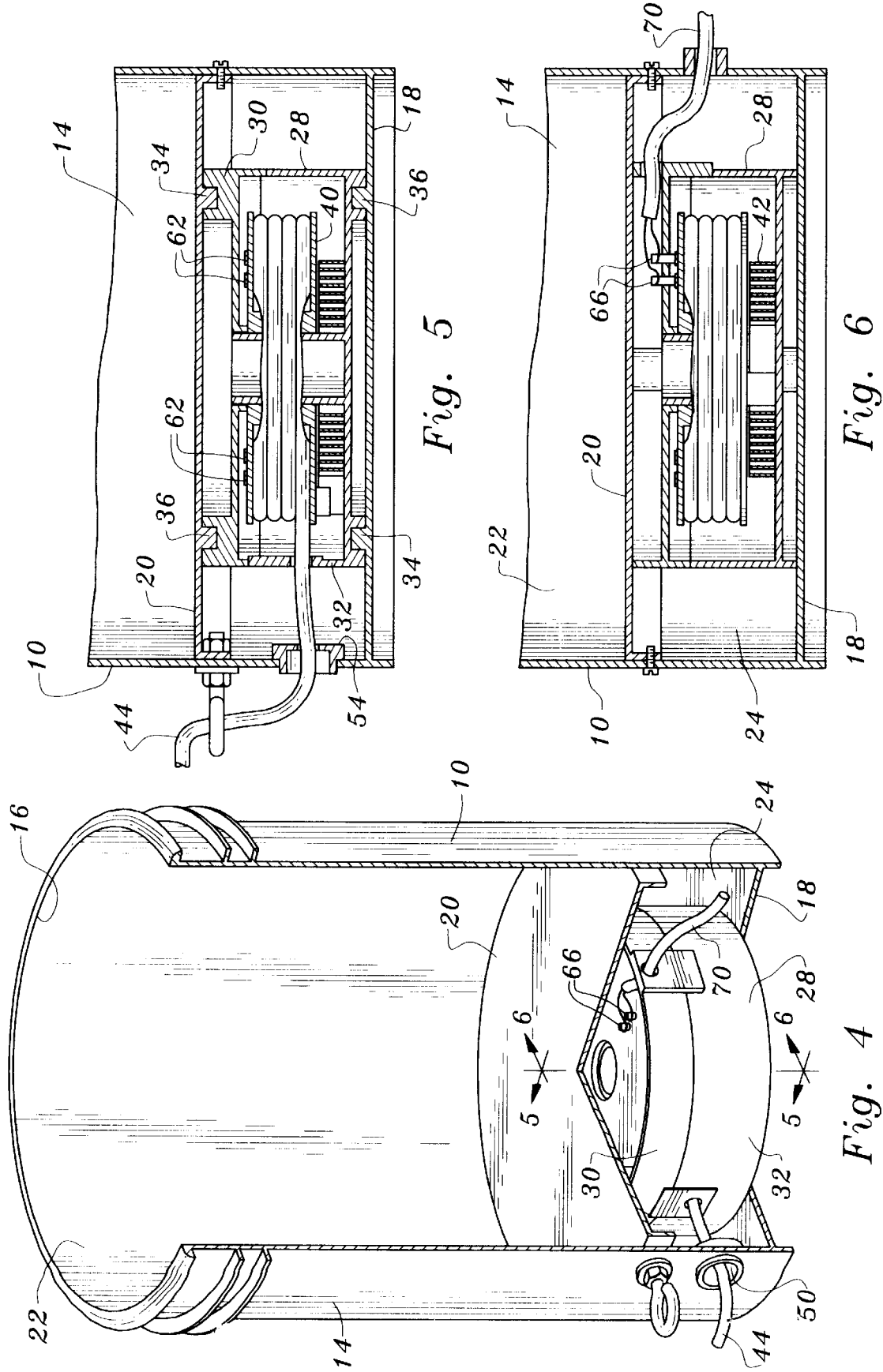

TOOL BUCKET WITH ELECTRICAL CORD STORAGE

TECHNICAL FIELD

This invention relates to apparatus for holding tools and for providing a connection to a source of electrical energy. The invention has wide-spread application but is particularly suitable for use by persons in the building and construction trades.

BACKGROUND OF THE INVENTION

It is known to utilize portable bucket-like receptacles and receptacles of other types to temporarily store and allow removal of elongated elements, such as electric extension cords. Representative devices of this nature are disclosed in the following United States patents: U.S. Pat. No. 5,103,977, issued Apr. 14, 1992, U.S. Pat. No. 4,984,685, issued Jan. 15, 1991, U.S. Pat. No. 5,449,067, issued Sep. 12, 1995, U.S. Pat. No. 5,421,457, issued Jun. 6, 1995, and U.S. Pat. No. 2,763,707, issued Sep. 18, 1956.

The portable containers or caddies disclosed in the above-identified patents are either completely dedicated to the storage and removal of electric extension cords or, if not solely dedicated to such purpose, have little or no room to carry tools and other articles. Thus, a worker is forced to use one or more separate carriers to store and carry his or her tools and equipment.

DISCLOSURE OF INVENTION

The present invention relates to apparatus which performs the dual functions of holding tools and providing an extension connection to a source of electrical energy. Thus, the worker can transport his or her tools to a job site at the same time he or she transports the means for inter-connecting electrical tools to an electrical outlet at the site. In the arrangement disclosed and claimed herein the tools are maintained out of engagement with the electrical cords utilized in the apparatus at all times so that the cords are not damaged by the tools or other equipment being stored.

The apparatus of the present invention is for holding tools and for providing a connection to a source of electrical energy. The apparatus incorporates a bucket including an outer peripheral wall defining a bucket interior and having an upper bucket end defining an opening communicating with the bucket interior and a lower bucket end.

A divider is disposed within the bucket interior dividing the bucket interior into an upper interior portion for receiving and holding tools and a lower interior portion. The divider prevents any tools in the upper interior portion from entering the lower interior portion. The outer peripheral wall of the bucket defines first and second holes communicating with the lower interior portion.

A first electrical cord having a first electrical connector extends outwardly from the lower interior portion with the first electrical connector disposed external of the bucket.

A second electrical cord having a second electrical connector extends outwardly from the lower interior portion with the second electrical connector disposed external of the bucket.

Means is employed to electrically connect the first electrical cord and the second electrical cord in the lower interior portion.

Cord retracting means is located in the lower interior portion for retracting at least one of the electrical cords so that a significant length thereof is located within the lower interior portion.

Other features, advantages, and objects of the present invention will become apparent with reference to the following description and accompanying drawings.

BRIEF DESCRIPTION OF DRAWINGS

FIG. 1 is a perspective view of apparatus instructed in accordance with the teachings of the present invention and illustrating a tool apron or sleeve positioned over the bucket component of the apparatus;

FIG. 2 is a perspective view of the apparatus with the tool apron removed from the bucket;

FIG. 4 is a perspective, partial-sectional view of the apparatus;

FIG. 5 is an enlarged, partial-sectional view taken along the line 5—5 in FIG. 4; and FIG. 6 is an enlarged, partial-sectional view taken along the line 6—6 in FIG. 4.

BEST MODE FOR CARRYING OUT THE INVENTION

Figure 3:
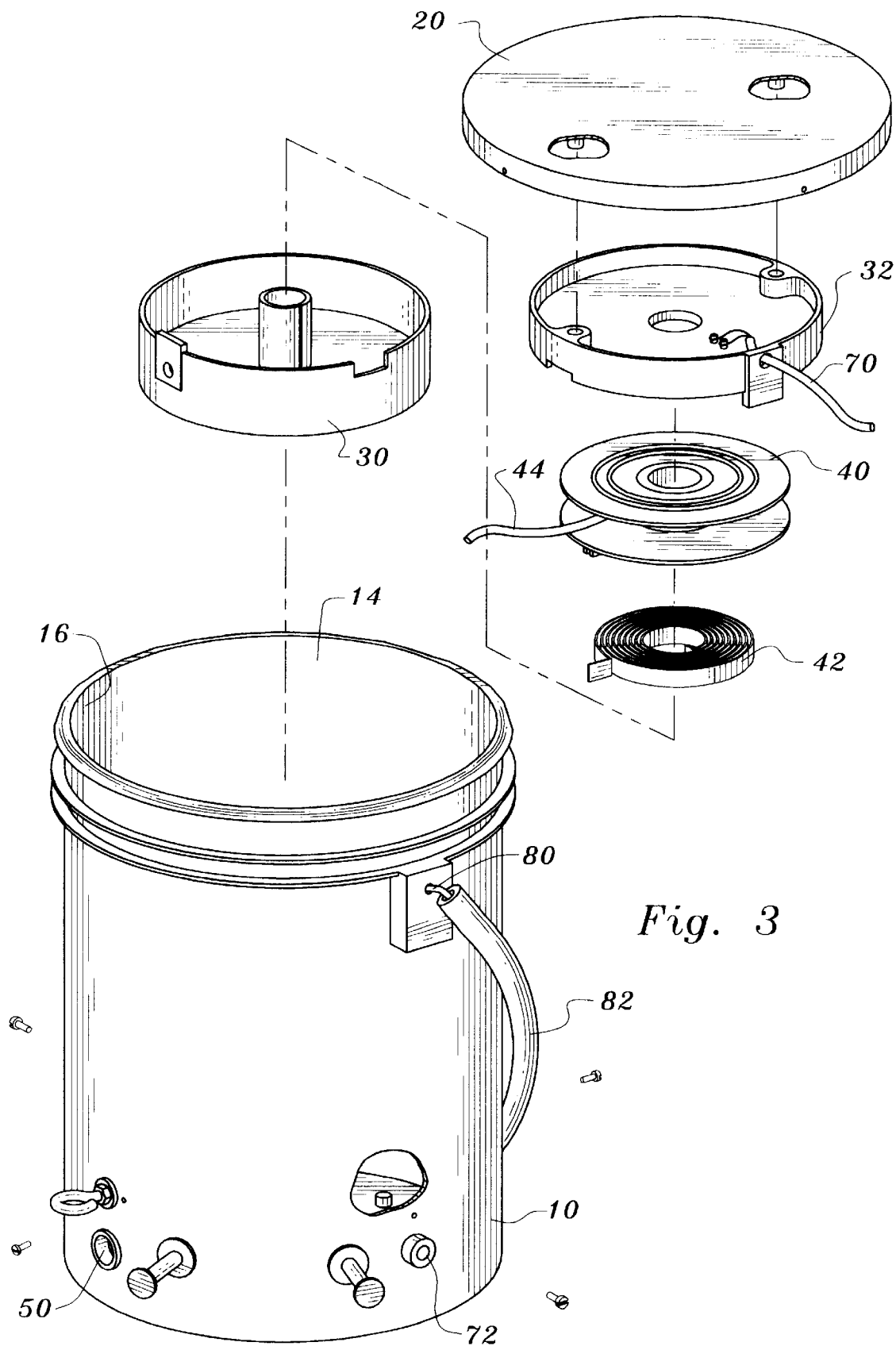
FIG. 3 is an exploded view of the apparatus illustrating components thereof prior to assembly.

Referring now to the drawings, apparatus constructed in accordance with the teachings of the present invention includes a bucket 10 which may be formed of any suitable material such as plastic. Bucket 10 includes a cylindrically-shaped outer peripheral wall 14 defining a bucket interior. The bucket has an upper bucket end defining an opening 16 communicating with the bucket interior and a lower bucket end. A bottom wall 18 is located at the bucket lower end.

A divider plate 20 is secured to the bucket by any suitable expedient, for example, mechanical fasteners such as the illustrated screws. The divider plate may, if desired, be so constructed as to form a substantially liquid-tight seal with the outer peripheral wall of the bucket. Divider plate 20 divides the bucket interior into an upper interior portion 22 for receiving and holding tools (not shown) and a lower interior portion 24. The divider plate prevents any tools in the upper interior portion from entering the lower interior portion.

Located between the bottom wall 18 and divider plate 20 is a cord retracting mechanism 28 including a housing comprised of two housing segments 30 and 32. Indents 34 formed in the housing segments receive detents 36 on the divider plate and bottom wall to securely fix the cord retracting mechanism 28 in place and lock the housing, bottom wall and divider plate against relative movement.

The cord retracting mechanism illustrated includes a spool 40 which is rotatably mounted and cooperable with a coil spring 42 to bias the spool in one rotational direction. This arrangement may, for example, be the same as or similar to electric cord retraction mechanisms found in vacuum cleaners.

Wrapped about spool 40 is an electrical cord 44, it being appreciated that spring 42 biases the spool in a direction tending to maintain the cord 44 in wound condition.

A hole 50 is formed in the outer peripheral wall of the bucket through which cord 44 passes after exiting the housing of the cord retracting mechanism. In the arrangement illustrated, a female electrical connector 52 is located at the distal end of cord 44. In the arrangement shown a bushing 54 is located in hole 50 to reduce cord wear. FIG.

1 shows cord 44 in its fully retracted condition. FIG. 2 shows the cord 44 having been pulled from the bucket, it being understood that a suitable lock mechanism (not shown) may be employed in the cord retracting mechanism to maintain the exposed cord at a desired length. A cord retention element in the form of a hook 60 projecting outwardly from the outer peripheral wall of the bucket may be utilized to position the cord 44 relative to the bucket.

Similar to the vacuum cleaner-type retraction mechanisms referenced above, spool 40 has located at the top thereof two parallel circular electrical contacts 62 to which the interior end of cord 44 is electrically connected. Mounted on the housing and maintained in engagement with electrical contacts 62 is a pair of stationary contacts 66 connected to a second electrical cord 70 which passes through a hole 72 defined by the outer peripheral wall 14 of the bucket. A male electrical connector 76 is located at the distal end of cord 70. Two peg-like protrusions 80 projecting from the bucket may be engaged by cord 70 and the cord wrapped thereabout is shown in FIG. 1.

Connected to bucket 10 is a handle 82 including an outer sleeve 84 utilized to carry the apparatus. The sleeve is formed from an insulating material such as rubber or plastic to electrically insulate the carrier's hand from the bucket.

FIG. 1 illustrates the apparatus being used in conjunction with a tool apron or sleeve 90 slipped over the bucket and including pockets which may be used to accommodate tools and other equipment both internally and externally of the bucket.

Sleeves of this nature are known in the art and employed with tool buckets. The structure of the apparatus of this invention allows use of such sleeves if desired. This is to be compared with typical extension cord caddies which are not adapted to such use.

I claim:

1. Apparatus for holding tools and for providing a connection to a source of electrical energy, said apparatus comprising, in combination:

a bucket including an outer peripheral wall defining a bucket interior and having an upper bucket end defining an opening communicating with said bucket interior and a lower bucket end, said bucket additionally including a bottom wall located at said lower bucket end and affixed to said outer peripheral wall;

a divider wall attached to the outer peripheral wall of said bucket and disposed within said bucket interior dividing said bucket interior into an upper interior portion for receiving and holding tools and a lower interior portion, said divider wall and said bottom wall being substantially parallel and spaced from one another with said divider wall, said bottom wall and said outer peripheral wall of said bucket defining said lower interior portion, said divider wall preventing any tools in said upper interior portion from entering said lower interior portion, said outer peripheral wall of said bucket defining first and second holes communicating with said lower interior portion and located between the locations where said divider wall and said bottom wall are connected to the outer peripheral wall of said bucket;

a first electrical cord having a first electrical connector extending outwardly from said lower interior portion with said first electrical connector disposed external of said bucket;

a second electrical cord having a second electrical connector extending outwardly from said lower interior portion with said second electrical connector disposed external of said bucket;

means electrically connecting said first electrical cord and said second electrical cord in said lower interior portion;

cord retracting means in said lower interior portion for retracting at least one of said electrical cords so that a significant length thereof is located within said lower interior portion, said cord retracting means including a housing extending between and in engagement with the bottom wall and the divider wall and fixedly positioned with respect thereto and a spool located in said housing between said bottom wall and said divider wall and rotatably mounted relative to said bucket and said housing about an axis of rotation orthogonal to said divider wall and said bottom wall within said lower interior portion for winding one of said electrical cords and spring means connected to said spool for rotating said spool; and electrical contact means on said spool for maintaining electrical contact between said first electrical cord and said second electrical cord.

2. The apparatus according to claim 1 wherein said divider wall forms a substantially liquid-tight seal with the outer peripheral wall of said bucket.

3. The apparatus according to claim 1 additionally comprising cord retention means projecting outwardly from the outer peripheral wall of said bucket for engagement by at least one of said electrical cords to maintain the engaged electrical cord or cords at a desired location relative to said bucket.

4. The apparatus according to claim 3 wherein said cord retention means comprises at least two cord retention elements projecting outwardly from the outer peripheral wall of said bucket, one of said cord retention elements being positioned adjacent to said first hole for engagement by and retention of said first electrical cord and another of said cord retention elements being positioned adjacent to said second hole for engagement by and retention of said second electrical cord.

5. The apparatus according to claim 1 wherein said housing, said bottom wall, said divider wall and said housing are locked together against relative movement by cooperating indents and detents formed on said housing, said bottom wall and said divider wall.

* * * * *